S. B. CONOVER.

Improvement in Fruit-Baskets.

No. 131,851.    Patented Oct. 1, 1872.

Witnesses:

UNITED STATES PATENT OFFICE.

STEPHEN B. CONOVER OF NEW YORK, N. Y., ASSIGNOR TO JOHN A. MOUNT, OF SAME PLACE.

IMPROVEMENT IN FRUIT-BASKETS.

Specification forming part of Letters Patent No. 131,851, dated October 1, 1872.

*To all whom it may concern:*

Be it known that I, STEPHEN B. CONOVER, of the city, county, and State of New York, have invented an Improvement in Fruit-Baskets, of which the following is a specification:

This invention is designed to provide a basket for the transportation of fruit which, while having the form found most advantageous by fruit-dealers, may be made without the bottom, usually formed separately, and then applied to the sides, and the manufacture of the basket be therefore carried on with less outlay of labor than that of those hitherto in use. It comprises a basket made of three or more pieces of wood, so formed and arranged that the basket is made with a convex-polygonal bottom, circular or nearly circular top, and sides open at suitable intervals, whereby the object stated is secured, and whereby, furthermore, the basket is made of symmetrical form, its contents properly ventilated, and the tendency to pack down in transportation is greatly reduced.

Figure 1:
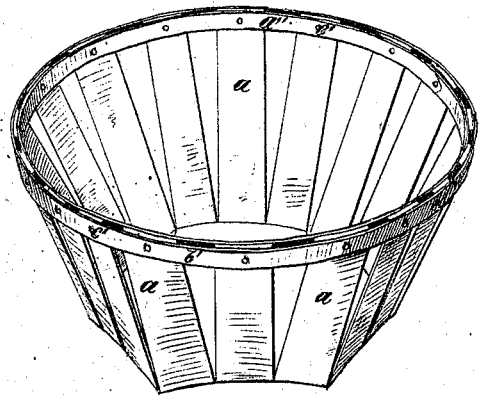
Figure 2:
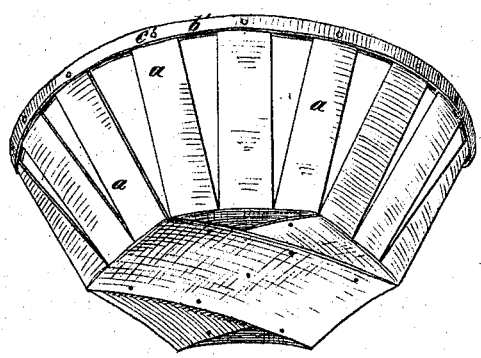
Figure 3:
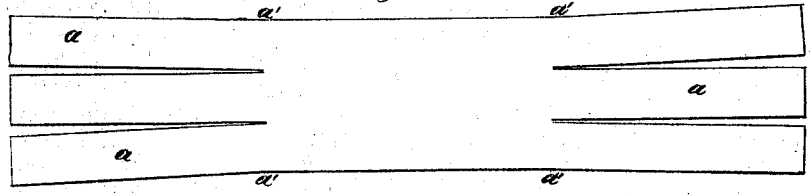

Figure 1 is a perspective view of a basket constructed according to my invention, as seen from a point above the plane of the top of the basket. Fig. 2 is a perspective view of same as seen from a point below the plane of the bottom of the basket. Fig. 3 is a detached plan view of one of the pieces or splints used in the construction of the basket.

Each of the splints or pieces of which the basket is composed has the form fully indicated in Fig. 3, and may be of any suitable thickness, say one-sixteenth of an inch, or thereabout. Each splint, for about one-third of its length, is split or divided at either end into three parts, $a$. In order to form the basket three or more of the splints are arranged with their central portions $b$ lapping over, and at an angle to each other, in such manner that the points $a'$ at the edges of each immediately opposite the slits in the ends will be brought in close proximity to the corresponding piece having its edge next adjacent, as will be more readily understood by reference to Fig. 2. This done, the overlapping central portions $b$ are secured together by tacks or nails, a concavo-convex form being given to the whole, the convex surface uppermost, as required, in the bottom of the basket. The end parts $a$ are then turned upward to any desired or suitable angle to the plane of the bottom, as shown in Figs. 1 and 2, and their extremities are bent or shaped to come between an inner hoop, $a''$, and an outer hoop, $b'$, and are there confined by nails, rivets, or other appropriate fastening, as shown at $c'$. The parts $a$ of each piece being cut straight across at their inner ends when turned up, to constitute the sides of the basket, as just set forth, of course give a hexagonal circumference to the bottom, while the upper ends of the parts, being fitted to the circular hoops $a'$ $b'$, give a round contour to the top, at the same time that the parts $a$, being brought further apart at top than at bottom, openings for the proper ventilation of the contents of the basket are provided.

The approximately-round form given to the basket pleases the eye, which is an important element in the trade to which it relates, and the convex bottom supports the fruit in such manner as to prevent it from becoming packed or crushed out of shape in the middle portion of the basket. The method of construction dispenses wholly with the bottom separately made and applied, as in round baskets hitherto made; and, furthermore, the basket is made of the smallest possible number of pieces, by which means it may be manufactured at a great saving of time and labor, as compared with other fruit-baskets in use. Of course, more than three of the pieces $a$ may be used, if desired, the number of angles to the bottom being increased in proportion, but the principle of construction remaining the same.

What I claim as my invention is—

A basket constructed of three or more splints, divided at their ends and crossing each other at their centers in such manner that when said ends are bent up and secured to a circular band at top the bottom shall assume a polygonal concavo-convex form, as shown and described.

S. B. CONOVER.

Witnesses:
FRED. HAYNES,
A. B. McNIEL.